United States Patent
Li et al.

(10) Patent No.: US 10,904,743 B2
(45) Date of Patent: Jan. 26, 2021

(54) METHODS FOR AUTOMATIC BOOTSTRAPPING OF A DEVICE

(71) Applicant: Telefonaktiebolaget LM Ericsson (publ), Stockholm (SE)

(72) Inventors: Qiang Li, Täby (SE); Ioannis Fikouras, Stockholm (SE); Marcus Gårdman, Skärholmen (SE); Niclas Jonasson, Älvsjö (SE); Athanasios Karapantelakis, Solna (SE); Cristian Norlin, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/603,923

(22) PCT Filed: Apr. 12, 2017

(86) PCT No.: PCT/EP2017/058732
§ 371 (c)(1),
(2) Date: Oct. 9, 2019

(87) PCT Pub. No.: WO2018/188739
PCT Pub. Date: Oct. 18, 2018

(65) Prior Publication Data
US 2020/0128392 A1     Apr. 23, 2020

(51) Int. Cl.
*H04W 8/00*     (2009.01)
*H04W 12/02*    (2009.01)
(Continued)

(52) U.S. Cl.
CPC ............ *H04W 8/205* (2013.01); *H04W 4/50* (2018.02); *H04W 4/60* (2018.02); *H04W 8/245* (2013.01); *H04W 12/06* (2013.01)

(58) Field of Classification Search
CPC . H04W 12/0602; H04W 8/183; H04W 12/04; H04W 4/14; H04W 8/25;
(Continued)

(56) References Cited

U.S. PATENT DOCUMENTS 9,119,069 B1 * 8/2015 Vipond ............... H04W 12/06
9,807,605 B2 * 10/2017 Gao .................... H04W 12/04
(Continued)

FOREIGN PATENT DOCUMENTS

WO    WO 2014/000157 A1    1/2014

OTHER PUBLICATIONS

International Search Report and Written Opinion of the International Searching Authority, PCT/EP2017/058732, dated Dec. 19, 2017 12 pages.
(Continued)

*Primary Examiner* — William D Cumming
(74) *Attorney, Agent, or Firm* — Sage Patent Group

(57) ABSTRACT

A provisioning node connected to a subscription manger can receive a provisioning profile request from a device. The provisioning profile request can include an identifier of the device. The provisioning node can further authenticate the device. The provisioning node can further obtain a provisioning profile for the device using the identifier of the device. The provisioning node can further send the provisioning profile to the device.

19 Claims, 8 Drawing Sheets

(51) Int. Cl.
*H04W 12/06* (2009.01)
*H04W 12/04* (2009.01)
*H04W 8/20* (2009.01)
*H04W 4/60* (2018.01)
*H04W 4/50* (2018.01)
*H04W 8/24* (2009.01)

(58) Field of Classification Search
CPC ........... H04W 8/205; H04W 12/04031; H04W 12/02; H04W 12/06; H04W 4/029
USPC .............................................. 455/411, 432.3
See application file for complete search history.

(56) References Cited

U.S. PATENT DOCUMENTS

| | | | | |
|---|---|---|---|---|
| 10,136,305 | B2* | 11/2018 | Chastain | H04W 8/183 |
| 10,334,428 | B1* | 6/2019 | Chen | H04W 8/205 |
| 10,341,848 | B2* | 7/2019 | Baek | H04W 8/205 |
| 10,439,823 | B2* | 10/2019 | Park | H04L 63/0823 |
| 2004/0229597 | A1* | 11/2004 | Patel | H04L 9/3273 |
| | | | | 455/411 |
| 2005/0278532 | A1* | 12/2005 | Fu | H04L 63/0869 |
| | | | | 713/169 |
| 2006/0030315 | A1* | 2/2006 | Smith | H04W 8/205 |
| | | | | 455/432.3 |
| 2007/0283153 | A1* | 12/2007 | Metke | H04L 9/3273 |
| | | | | 713/169 |
| 2008/0178004 | A1* | 7/2008 | Wei | H04W 12/04031 |
| | | | | 713/171 |
| 2015/0121495 | A1* | 4/2015 | Gao | H04W 12/02 |
| | | | | 726/6 |
| 2016/0330608 | A1 | 11/2016 | Benn | |
| 2016/0373920 | A1 | 12/2016 | Petersson et al. | |
| 2017/0150362 | A1* | 5/2017 | Clemenson | H04W 4/029 |
| 2018/0123803 | A1* | 5/2018 | Park | H04L 63/12 |
| 2018/0160292 | A1* | 6/2018 | Chastain | H04W 12/04 |
| 2018/0176768 | A1* | 6/2018 | Baek | H04W 8/205 |
| 2019/0045353 | A1* | 2/2019 | Chastain | H04W 12/0609 |
| 2020/0052907 | A1* | 2/2020 | Park | H04L 9/3228 |
| 2020/0128392 | A1* | 4/2020 | Li | H04W 4/50 |

OTHER PUBLICATIONS

GSM Association, "Embedded SIM Remote Provisioning Architecture", Official Document 12FAST.13, Version 1.1, Dec. 17, 2013, pp. 1-84.

GSM Association, "RSP Architecture" Official Document SGP.21, Version 2.0, Aug. 23, 2016, pp. 1-94.

GSM Association, "RSP Technical Specification", Official Document SGP.22, Version 1.1, Jun. 9, 2016, pp. 1-125.

* cited by examiner

METHODS FOR AUTOMATIC BOOTSTRAPPING OF A DEVICE

This application is a 35 U.S.C. § 371 national stage application of PCT International Application No. PCT/EP2017/058732 filed on Apr. 12, 2017, the disclosure and content of which is incorporated by reference herein in its entirety.

TECHNICAL FIELD

The technology disclosed herein relates generally to the field of bootstrapping, and in particular to a method for automatic bootstrapping of a device, a provisioning node, a device, computer programs and computer program products.

BACKGROUND

In the current state of art, remote provisioning of a cellular connectivity-enabled device requires the device to have a bootstrapping/provisioning profile that allows it to communicate with a subscription manager node. A known solution for such remote provisioning is, for instance, embedded Subscriber Identity Module (SIM), such as e.g. Embedded Universal Integrated Circuit Card (eUICC) and integrated SIM (iUICC). The former has a dedicated physical eUICC chip soldered on the device's circuit board, whereas the latter is software having the functionality of the eUICC chip and being burned into an existing chip (e.g. device processor or its cellular communication modem).

However, even with such solutions for remote provisioning that do not involve a physical SIM card, the issue remains that for a device to be bootstrapped, it needs to have local storage of a provisioning profile. The provisioning profile has a significant monetary cost and it must be imprinted in the eUICC chip, or, in case of iUICC, to be hardcoded in the software. The provisioning profile is described in a Global System for Mobile Communication Association (GSMA) eUICC specification for M2M devices.

There is a more recent GSMA eUICC standard for consumer devices describing bootstrapping of a "companion device" from a "primary device". The companion device initially does not have any provisioning profile. Instead, the primary device can help the companion device to download a profile in a bootstrap process. However, the bootstrap process in GSMA requires an end user to own (or at least have access to) the "primary device" and the "companion device", and also to trigger the bootstrapping of the "companion device". The involvement of the end user is required for the whole bootstrap process.

The user involvement is impractical and even impossible in some situations where bootstrapping of the device is required. For instance, a user having to bootstrap many Machine to Machine (M2M) devices, which may have no end user intervention when in use and possibly located at very remote or rural areas, may be highly time consuming. A first such exemplary scenario is cars comprising a device for wireless connectivity ("connected cars") arriving at a port of entry in a cargo ship and which cars need to load a local Mobile Network Operator (MNO) profile. A second scenario is M2M devices made in country A, arriving at retail or warehouse in country B, and which M2M devices need to load an MNO profile of country B. In, for instance, these cases, the GSMA specification for consumer devices cannot be used to bootstrap the M2M devices. Further, the GSMA specification for M2M devices always requires a provisioning profile. However, a M2M device produced in a first country may not have a provisioning profile for country B due to cost or for technical reason, but only for country A.

SUMMARY

An objective of the present teachings is to address and improve various aspects for bootstrapping of devices. A particular objective is to enable automated bootstrapping of devices. Another objective is to enable automated bootstrapping of devices that do not have an installed provisioning profile. This objective and others are achieved by the methods, devices, nodes, computer programs and computer program products according to the appended independent claims, and by the embodiments according to the dependent claims.

The objective is according to an aspect achieved by a method for automatic bootstrapping of a device. The method is performed by a provisioning node connected to a subscription manager. The method comprises receiving a provisioning profile request from the device, the provisioning profile request comprising an identifier of the device. The method comprises authenticating the device, and obtaining, based on the identifier of the device, a provisioning profile for the device. The method comprises sending the provisioning profile to the device.

The method provides a number of advantages. For instance, by means of the method a manufacturer of e.g. M2M devices is alleviated from the need to (a priori) install expensive provisioning profiles on the device. The method is a highly convenient way of automatically bootstrap a large number of devices, removing also the need for the consumer/end user of the device to perform a remote bootstrapping process. Once the device is bootstrapped it is provided with e.g. cellular connectivity.

The objective is according to an aspect achieved by a computer program for a provisioning node. The computer program comprises computer program code, which, when run on at processing circuitry of the provisioning node causes the provisioning node to perform the method as above.

The objective is according to an aspect achieved by a computer program product comprising a computer program as above and a computer readable means on which the computer program is stored.

The objective is according to an aspect achieved by a provisioning node for automatic bootstrapping of a device. The provisioning node is configured to: receive a provisioning profile request from the device, the provisioning profile request comprising an identifier of the device, authenticate the device, obtain, based on the identifier of the device, a provisioning profile for the device, and send the provisioning profile to the device. The provisioning node is a new type of node, connected to existing nodes, such as a subscription manager node. The provisioning node according to the present teachings may e.g. broadcast information to nearby devices, informing about its provisioning services.

The objective is according to an aspect achieved by a method for bootstrapping performed by a device. The method comprises sending a provisioning profile request to a provisioning node, including in the provisioning profile request an identifier of the device, authenticating the provisioning node, and receiving, from the provisioning node, a provisioning profile.

The objective is according to an aspect achieved by a computer program for bootstrapping of a device. The computer program comprises computer program code, which, when run on at processing circuitry of the device causes the device to perform the method as above.

The objective is according to an aspect achieved by a computer program product comprising a computer program as above and a computer readable means on which the computer program is stored.

The objective is according to an aspect achieved by a device for bootstrapping. The device is configured to: send a provisioning profile request to a provisioning node, including in the provisioning profile request an identifier of the device, authenticate the provisioning node, and receive, from the provisioning node, a provisioning profile.

Further features and advantages of the embodiments of the present teachings will become clear upon reading the following description and the accompanying drawings.

DETAILED DESCRIPTION

Figure 1:
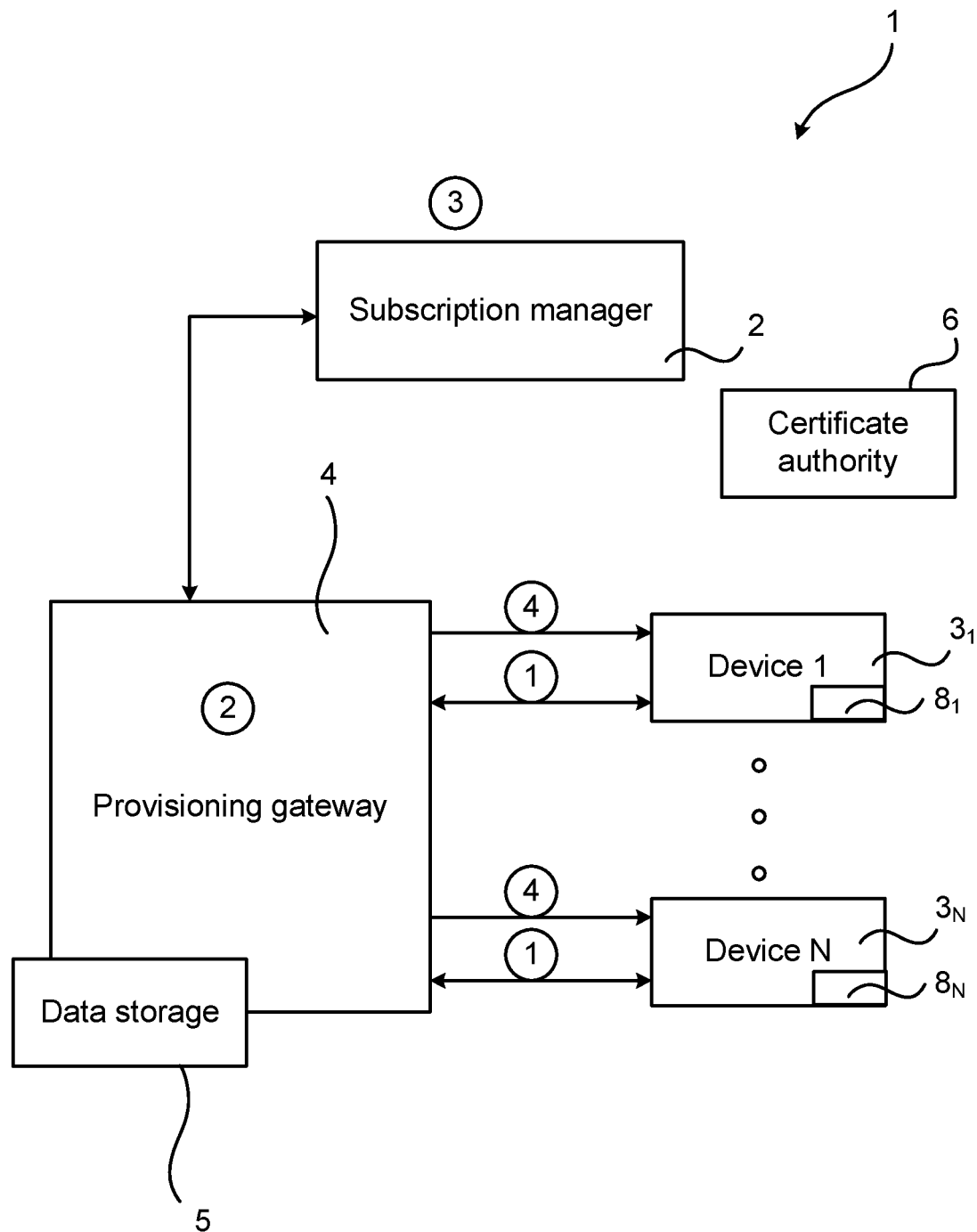
FIG. 1 illustrates schematically an environment in which embodiments according to the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the present teachings provide, in various embodiments, nodes and devices of a system and methods that provide automated bootstrapping of devices. The bootstrapping may be performed by a provisioning node (e.g. a provisioning gateway) which is connected to a subscription manager. This enables, for instance, automatic mass-bootstrap, i.e. automated bootstrapping of many devices simultaneously from the provisioning node. A handshake process between the device and the provisioning node is disclosed. The process is fully automated and involves the device and provisioning node discovering one another, the provisioning node checking whether the device is eligible for a provisioning profile, and the provision profile being downloaded and installed to the device by the provisioning gateway. The whole process can be done without any requirements on end user involvement. Once the bootstrap process is complete the device obtains connectivity to a wireless network, e.g. to a mobile network.

FIG. 1 illustrates schematically an environment in which embodiments according to the present teachings may be implemented.

A system 1 comprises one or more devices $3_1, \ldots, 3_N$, e.g. M2M devices. The devices $3_1, \ldots, 3_N$ are equipped with means $8_1, \ldots, 8_N$ for wireless communication. In the following the means $8_1, \ldots, 8_N$ for wireless communication is exemplified by a wireless modem (e.g. a cellular modem) $8_1, \ldots, 8_N$. The wireless modem $8_1, \ldots, 8_N$ is a device by means of which the device $3_1, \ldots, 3_N$ can communicate wirelessly. The devices $3_1, \ldots, 3_N$ do not have a provisioning/bootstrapping profile. The devices $3_1, \ldots, 3_N$ may, for instance, have connectivity to a mobile network by means of their wireless modem $8_1, \ldots, 8_N$ but they are not connected to a subscription manager of the mobile network and do not have a provisioning profile.

Each device $3_1, \ldots, 3_N$ has a unique identifier. This unique identifier may, for example, be a Media Access Control (MAC) address of its wireless modem $8_1, \ldots, 8_N$, or the serial number of the device $3_1, \ldots, 3_N$. For example, if the device $3_1, \ldots, 3_N$ is a connected vehicle, the identifier can be a Vehicle Identification Number (VIN). It is noted that various other unique identifiers are also possible.

Since each device $3_1, \ldots, 3_N$ comprises means for wireless communication, it can thereby transmit its identifier to nearby provisioning node 4, which in the figure and in the following is exemplified by a provisioning gateway 4. The device $3_1, \ldots, 3_N$ may send its identifier e.g. by using short-range radio such as Near-Field Communication (NFC), Bluetooth or WiFi, wireless Universal Serial Bus (USB) standards, etc. In other embodiments, long-range radio e.g. a low power wide area network (LPWAN) such as NarrowBand IoT (NB-IoT), or 2G, 3G, 4G, 5G may be used. If the communication is performed over e.g. a 2G, 3G, 4G, 5G the provisioning gateway 4 may be part of a radio access node, e.g. included in a radio base station.

Each device $3_1, \ldots, 3_N$ is capable of receiving a provisioning profile from the provisioning gateway 4 and bootstrapping the cellular modem $8_1, \ldots, 8_N$ using the received provisioning profile.

The system 1 comprises the provisioning gateway 4, which mediates between a subscription manager 2 and a device $3_1, \ldots, 3_N$, as the devices $3_1, \ldots, 3_N$ are not able to communicate directly with the subscription manager 2.

The provisioning gateway 4 responds to a "provisioning profile request" received from a nearby device $3_1, \ldots, 3_N$ either proactively, i.e. via discovery of the nearby device $3_1, \ldots, 3_N$, or on a request initiated from the device $3_1, \ldots, 3_N$ itself (described more in detail later). In short, the provisioning gateway may in different ways be made aware of the existence of one or more devices $3_1, \ldots, 3_N$ (indicated at encircled numeral 1).

The provisioning gateway 4 matches the device identifier received in the provisioning profile request to a provisioning profile. The provisioning profile may be available in the provisioning gateway 4 a priori, or the provisioning gateway 4 may request this profile from the subscription manager 2. The latter is illustrated in the figure at encircled numerals 2 and 3: at encircled 2, the provisioning gateway 4 creates a profile request for the device $3_1, \ldots, 3_N$ and at encircled numeral 3 it sends the profile request to the subscription manager 2 and downloads the provisioning profile therefrom. The matching process may, for instance, comprise comparing the device identifier embedded in the provisioning profile request to a list of <deviceID, provisioningProfile>tuples of eligible devices $3_1, \ldots, 3_N$ in order to receive the desired provisioning profiles. Such list may be stored internally in the provisioning gateway 4 (e.g. a data storage thereof), or the provisioning gateway 4 may retrieve it from another system or from e.g. a data storage 5.

The provisioning gateway 4 downloads (encircled numeral 4) the provisioning profile to the device $3_1, \ldots, 3_N$, which in turn can bootstrap itself. This step can, for instance, be performed according to the GSMA standards.

The system 1 comprises a subscription manager 2, which is responsible for managing subscriptions. The subscription manager 2, which may be part of a mobile network, has access to a database that stores subscription profiles. Mobile Network Operators may download new profiles to the subscription manager 2. The subscription manager 2 has means for downloading and installing subscription profiles to the devices $3_1, \ldots, 3_N$ (once they have been provided with a provisioning profile). The devices may, for instance, be eUICC-enabled devices or iUICC-enabled devices. In eUICC standard, the subscription manager component combines functionality of subscription manager data preparation (SM-DP) and subscription manager secure routing (SM-SR) components.

The provisioning node 4 (provisioning gateway) is a new type of node (e.g. a gateway), and may be connected to existing nodes, in particular connected to a subscription manager node such as the above mentioned eUICC provisioning nodes SM-DP and SM-SR components. The provisioning node 4 may e.g. broadcast information informing devices about its provisioning services. By means of the provisioning node 4, user intervention in the bootstrapping process can be avoided: the device receives information about the provisioning service and can thereby initiate a bootstrapping by sending a provisioning profile request. The provisioning node 4 can download a provision profile and install it in the device.

The system 1 may also comprise a certificate authority 8, for use in a mutual authentication process between the device $3_1, \ldots, 3_N$ and the provisioning gateway 4.

Figure 2:
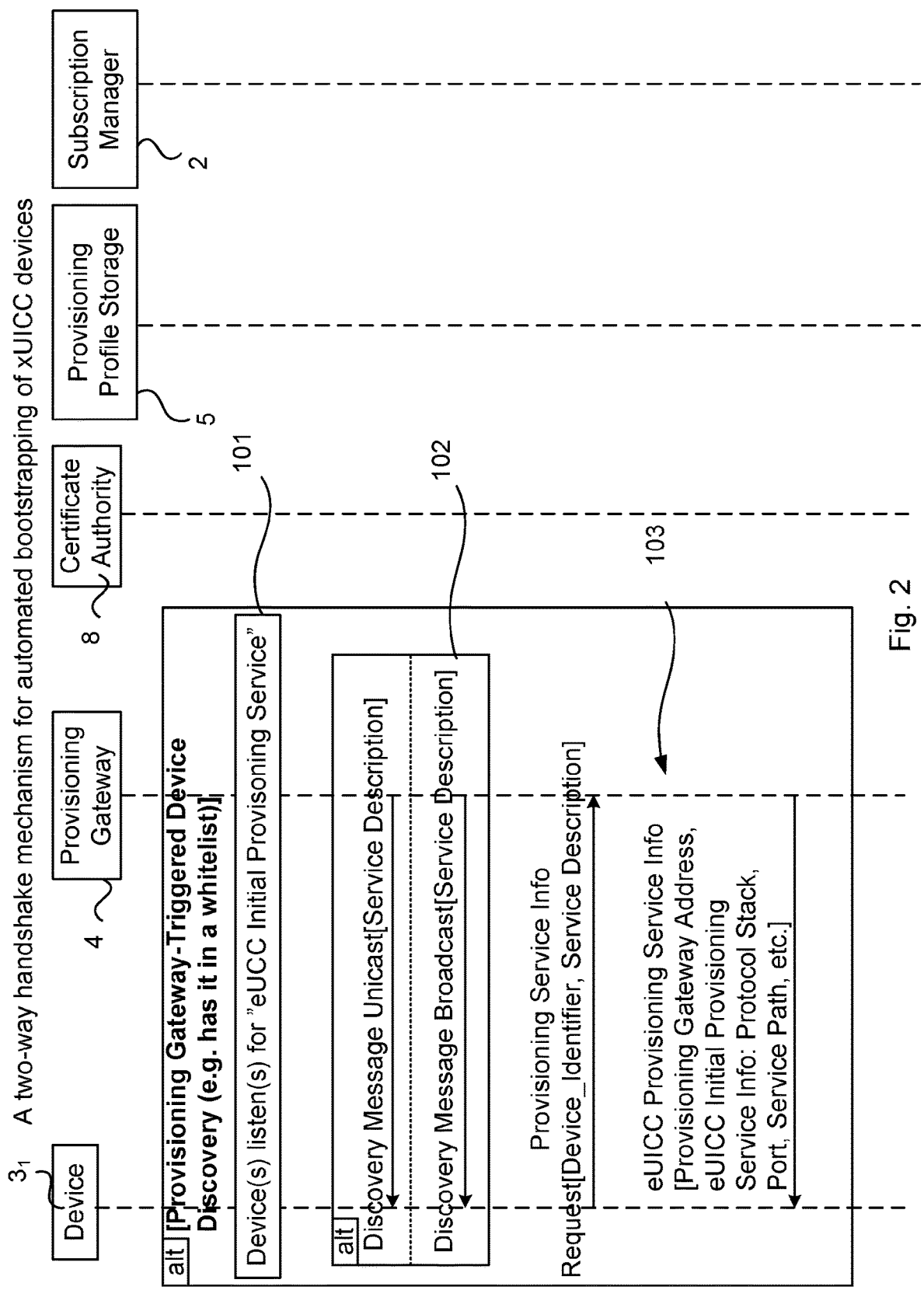
FIG. 2 is a sequence diagram illustrating automated bootstrapping of devices.
Figure 2:
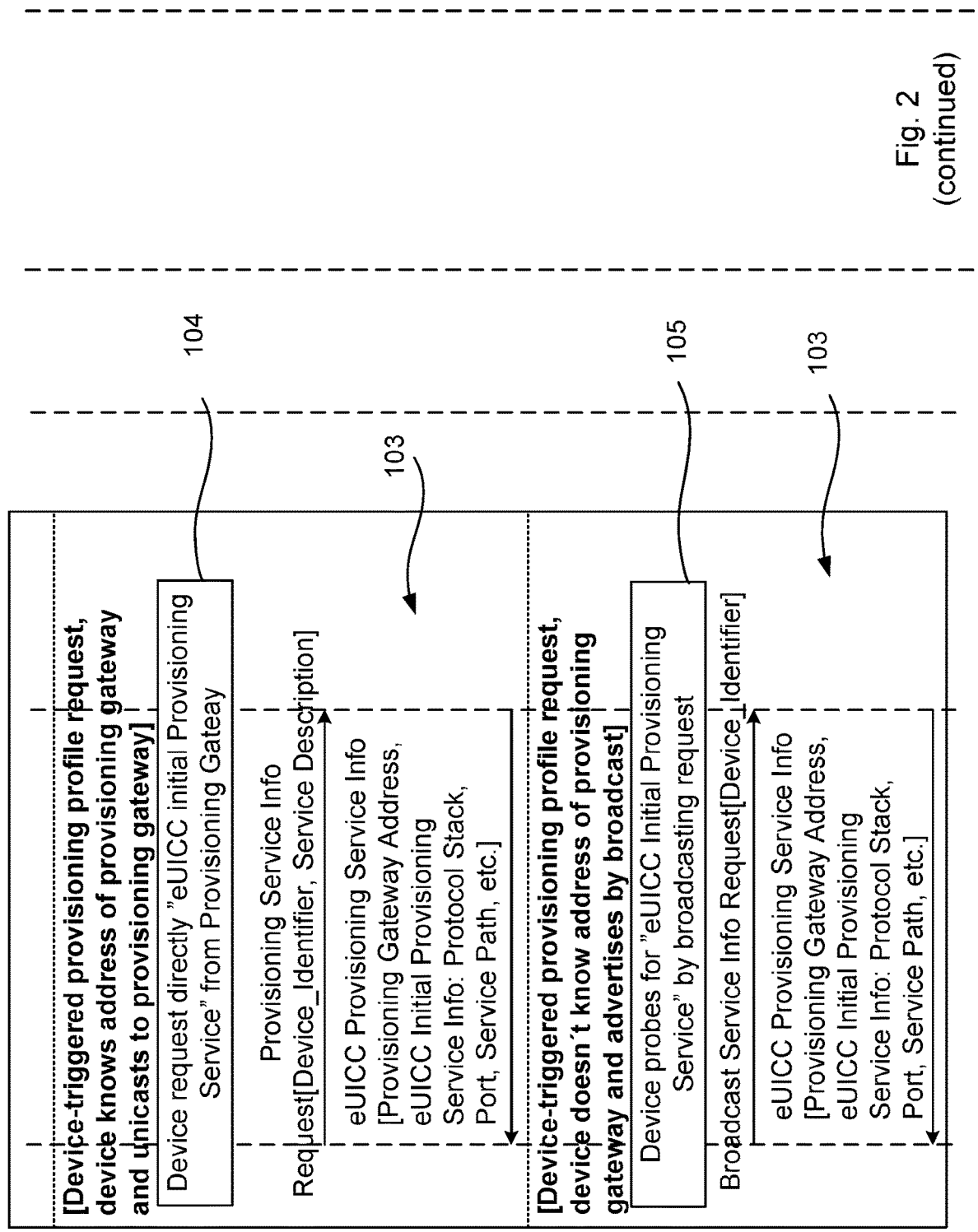
Figure 2:
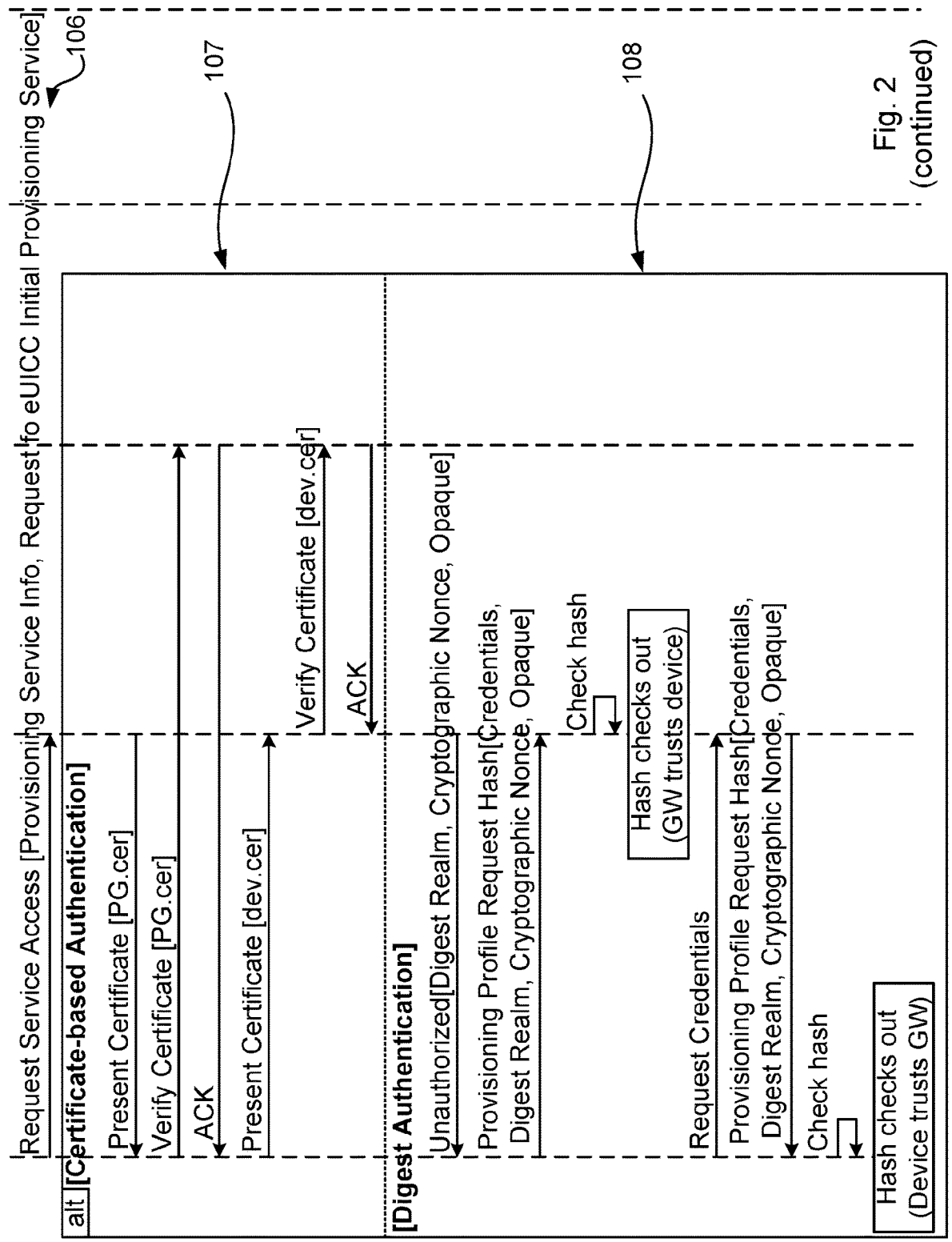
Figure 2:
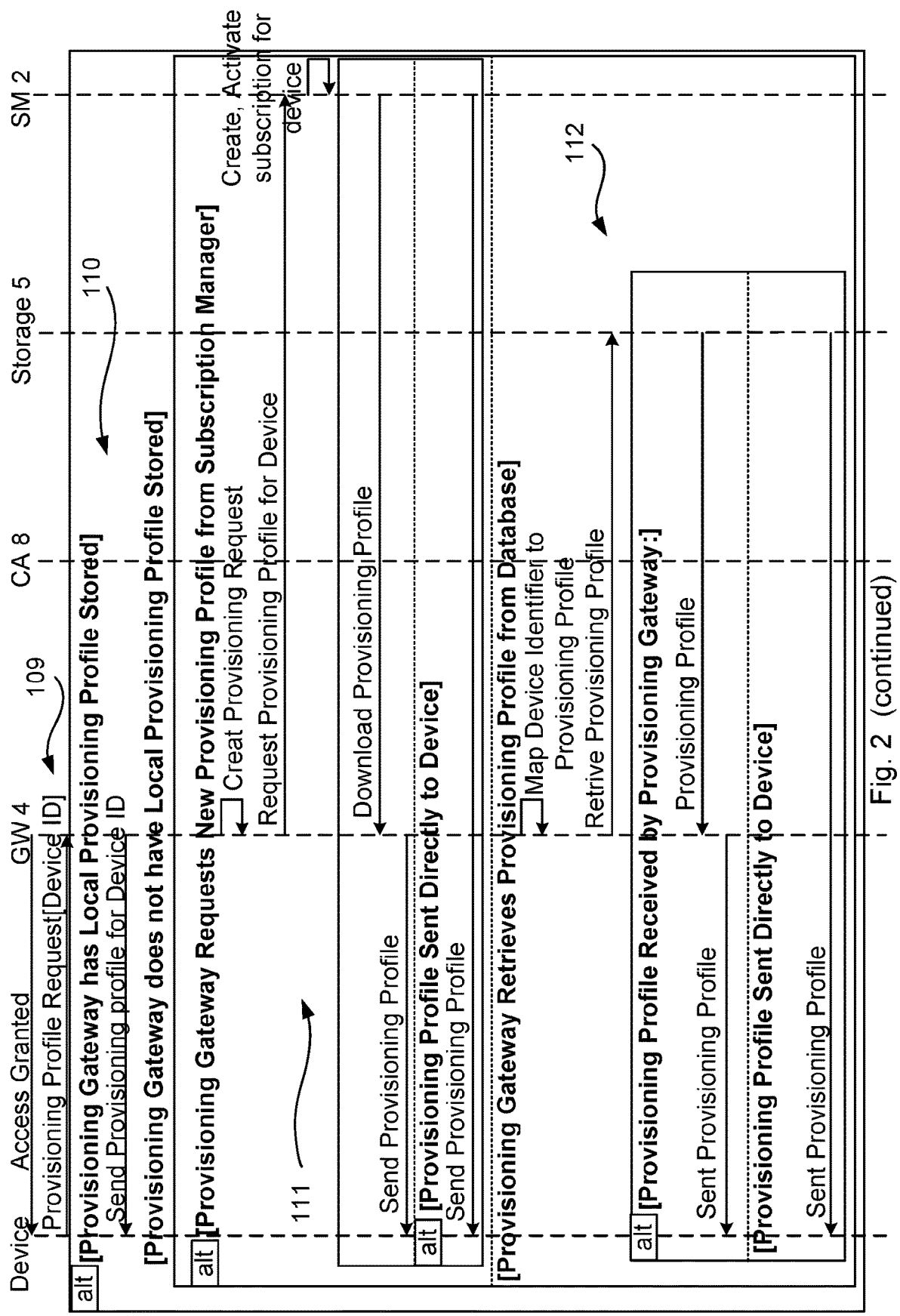

FIG. 2 is a sequence diagram illustrating automated bootstrapping of devices, in particular devices that do not have been provided with a provisioning profile during their manufacturing.

It is noted that the sequence diagram illustrates a number of different embodiments, as will become clear in the following. For instance, in some embodiments the provisioning gateway 4 may trigger device discovery, while in other embodiments the device instead trigger the process by sending a provisioning profile request (provided it knowns the address of the provisioning gateway 4 beforehand).

The bootstrapping process may thus start by a request from the device to the provisioning gateway 4, asking for a provisioning profile. Three ways of doing this request are given next.

1. The request may be performed in a proactive way by the device $3_1, \ldots, 3_N$ discovering the provisioning gateway 4. In this case, the provisioning gateway 4 may broadcast an advertisement to all devices $3_1, \ldots, 3_N$. All new devices $3_1, \ldots, 3_N$ listen to these broadcast messages (illustrated at reference numeral 101) and then connect to the provisioning gateway 4. This can be compared to a cellular device (e.g. user equipment, UE) joining a Radio Base Station: it listens to information sent from the radio base station and is thereby able to connect to it. In other embodiments, multicasting (unicast or broadcast) messages to a specific multicast group is implemented (illustrated at reference numeral 102). For example, the devices $3_1, \ldots, 3_N$ may be vehicles that are offloaded at a port of entry, and the provisioning gateway 4, being aware of these vehicles, multicasts an advertisement message to them. The advertisement message may, for instance comprise the address of the provisioning gateway 4.

For all above options, the device $3_1, \ldots, 3_N$ then sends (illustrated at reference numeral 103) a request for provisioning service related information including in the request its device identifier and a service description. In response, the provisioning gateway 4 sends the requested information, e.g. provisioning gateway address, eUICC initial provisioning service information such as e.g. protocol stack, port number, service path etc.

2. The request may be triggered from the device $3_1, \ldots, 3_N$ by the device $3_1, \ldots, 3_N$ unicasting a message to the provisioning gateway's address, in case the device $3_1, \ldots, 3_N$ knows the address of the provisioning gateway 4 a priori (illustrated at reference numeral 104). That is, the device initiates the provisioning process by sending a request to the provisioning gateway 4 requesting e.g. an eUICC initial provisioning service. Thereafter the steps described in relation to reference numeral 103 are performed.

3. The device $3_1, \ldots, 3_N$ may broadcast an advertisement message (illustrated at reference numeral 105), and the provisioning gateway 4 may be configured to listen to all broadcast message and capture the device $3_1, \ldots, 3_N$ that initiates the request. This is again illustrated at reference numeral 103.

The provisioning profile request comprises a unique identifier of the device. As exemplified earlier, this identifier may, for instance, be the MAC address of the wireless modem. Thereafter the steps described in relation to reference numeral 103 are performed.

The device $3_1, \ldots, 3_N$ and the provisioning gateway 4 have now discovered each other, but they need to make sure that they trust each other prior to starting the provisioning service. The device $3_1, \ldots, 3_N$ sends (reference numeral 106) a request for service access including provisioning service information and request for e.g. eUICC Initial provisioning service. FIG. 2 illustrate two different options for a mutual authentication following this request, which options are described next.

A first alternative is to use a mutual trust authentication mechanism based on certificate verification by a trusted Certificate Authority 8. The Certificate Authority (CA) has to be reachable by both the device $3_1, \ldots, 3_N$ and the provisioning gateway 4. It is noted that the CA 8 is a logical node and may reside in the same physical entity as the provisioning gateway 4. As a prerequisite, both the device $3_1, \ldots, 3_N$ and the provisioning gateway 4 must have certificates signed by the same CA 8. This is illustrated at reference numeral 107: the provisioning gateway 4 sends its certificate to the device, the device verifies the received certificate with the CA 8, which in the illustrated case acknowledges the certificate, the device sends its certificate to the provisioning gateway 4, which verifies it with the CA 8, upon which the CA 8 acknowledges the certificate.

A second alternative is to use a digest authentication mechanism, where the device $3_1, \ldots, 3_N$ supplies credentials to the provisioning gateway 4. This type of authentication may also be performed the other way around, i.e. the device $3_1, \ldots, 3_N$ authenticating the provisioning gateway 4, so that trust for both the devices $3_1, \ldots, 3_N$ and the provisioning gateway 4 is established. This is a less secure mechanism than the first alternative, but has the advantage of not requiring that a certificate is stored on the device $3_1, \ldots, 3_N$, which may be expensive to obtain. This is illustrated at reference numeral 108: the provisioning gateway 4 sends its credentials to the device, the device sends a provisioning profile request hash (hash of the received credentials, digest realm, cryptographic nonce, opaque). The provisioning gateway 4 checks the received hash and the hash in the illustrated case is correct and the provisioning gateway 4 trusts the device sending the hash. Next, the device requests credentials from the provisioning gateway 4, which responds with a provisioning profile request hash (hash of the received credentials, digest realm, cryptographic nonce, opaque). The device checks this hash and if correct, the device trusts the provisioning gateway 4.

Which authentication mechanism to use may be selected e.g. in view of required level of security and other functional specifications of the particular use case.

After the mutual authentication (and illustrated at reference numeral 109), the provisioning gateway 4 grants access to the device, which sends a provisioning profile request, including in the request its unique identifier.

When the device $3_1, \ldots, 3_N$ and the provisioning gateway 4 have been mutually authenticated, and the provisioning gateway 4 has received a request from an identified device, the provisioning gateway 4 maps the device identifier to a provisioning profile. There are several alternatives for performing this mapping and some examples are given next:

1. The provisioning gateway 4 may have a<device ID, provisioning profile>list, where all provisioning profile for eligible devices $3_1, \ldots, 3_N$ are stored locally. The provisioning gateway 4 then traverses the list until it matches device identity (device ID) of the request to a device ID in the list, and then returns the provisioning profile for the corresponding identifier. This is illustrated at reference numeral 110.

2. In some cases the provisioning gateway 4 only has a list of <device ID> or no list at all, depending on whether all discovered devices should get connectivity, or a pre-existing group of devices. The provisioning gateway 4 may then asks for a new provisioning profile from the subscription manager 2. This is illustrated at reference numeral 111: the provisioning gateway 4 creates a provisioning request for the identified device and sends the request to a subscription manager 2. The subscription manager 2 creates and activates a subscription for the device, and the provisioning gateway 4 may then download the requested provisioning profile and send it to the device. In a variation, the subscription manager 2 sends the provisioning profile directly to the device instead of sending it to the provisioning gateway 4.

3. The provisioning gateway 4 has a<device ID, provisioning profile URI>list, where the provisioning profile URI is a reference to an external entity, by means of which the provisioning gateway 4 can retrieve the provisioning profile. This external entity may be, for instance, be a provisioning profile database store 5. Such options are illustrated at reference numeral 112: after having mapped the device identifier to a provisioning profile, the provisioning profile is retrieved from the database 5.

In case of options 2 and 3, the provisioning profile is first received by the provisioning gateway 4, which may then be sent to the device $3_1, \ldots, 3_N$, or the data storage 5 may send the provisioning profile directly to the device $3_1, \ldots, 3_N$ (e.g. in case the device has IP connection, e.g. over WiFi, etc.). In the latter case, the provisioning gateway 4 is mainly tasked with discovering the devices and creating a profile request for the devices.

For all options 1, 2 and 3, the provisioning gateway 4 downloads the provisioning profile to the device, which subsequently bootstraps its cellular access using the provisioning profile.

It is noted that the nodes are logical, and may be co-located in the same physical entity. For example, the provisioning gateway 4 and the provisioning profile store 5 may be in separate entities or in the same physical network node, or can even be part of another node (e.g. radio base station as mentioned earlier).

Figure 3:
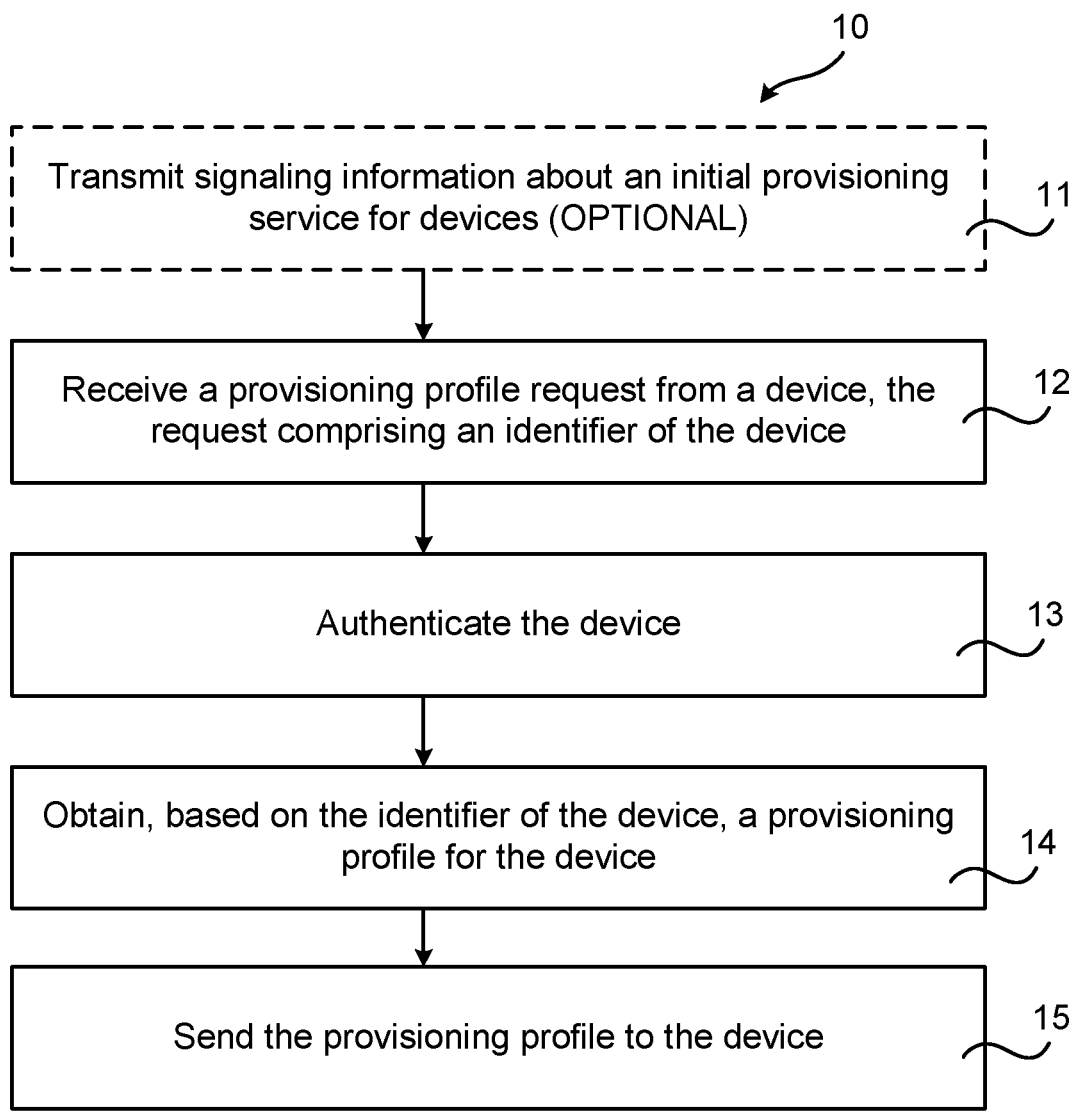
FIG. 3 illustrates a flow chart over steps of an embodiment of a method in a node in accordance with the present teachings.

FIG. 3 illustrates a flow chart over steps of an embodiment of a method in a provisioning node in accordance with the present teachings.

A method 10 for automatic bootstrapping of a device $3_1, \ldots, 3_N$ is provided. The method 10 may be performed by a provisioning node 4 that is connected to a subscription manager 2. The method to comprises:

receiving 12 a provisioning profile request from the device $3_1, \ldots, 3_N$, the provisioning profile request comprising an identifier of the device $3_1, \ldots, 3_N$, authenticating 13 the device $3_1, \ldots, 3_N$, obtaining 14, based on the identifier of the device $3_1, \ldots, 3_N$, a provisioning profile for the device $3_1, \ldots, 3_N$, and sending 15 the provisioning profile to the device $3_1, \ldots, 3_N$.

The method 10 provides a number of advantages. For instance, the method 10 renders the provisioning of a large number of devices, e.g. M2M devices, less complicated and highly cost-efficient. By means of the method 10, the devices $3_1, \ldots, 3_N$ do not have to be provided with a provisioning profile at manufacture thereof. For instance, for a eUICC device the soldering of a dedicated physical eUICC chip on the eUICC device's circuit board can be omitted, largely reducing manufacturing costs. For an iUICC device the burning of software having the functionality of the eUICC chip can be omitted, whereby manufacturing costs may be highly reduced. The provisioning node may, for instance, be a provisioning gateway owned by a mobile network operator or state regulator. As described earlier, e.g. with reference to FIG. 2, the "provisioning profile request" may be a device-triggered request if the device knows the address of the provisioning node 4, or it may be a request received in response to a unicast message from the provisioning node 4 to the device if the provisioning node 4 knowns the address of the device, or it may be a request received in response to a discovery message sent (e.g. broadcast or multicast) by the provisioning node 4.

In an embodiment, the method 10 comprises, before receiving 12 the provisioning profile request, transmitting 11 signaling informing about an initial provisioning service for devices $3_1, \ldots, 3_N$. The dashed lines of box 11 in the FIG. 3 indicates that this is an optional step.

By having the provisioning node informing devices about an initial provisioning service for devices $3_1, \ldots, 3_N$ the method 10 may be an entirely automated process for provisioning devices and user intervention can be omitted. The transmitting of signaling that informs devices $3_1, \ldots, 3_N$ about the initial provisioning service provided by the provisioning node 4 may, for instance, comprise broadcasting the information or multicasting the information. The information may be targeted to a particular type of devices $3_1, \ldots, 3_N$, for instance intended to eUICC devices ("eUICC Initial Provisioning Service), as has been described earlier, e.g. in relation to FIG. 2. Broadcasting or multicasting the information, e.g. periodically, is a convenient way of informing a large number of devices $3_1, \ldots, 3_N$ that receives the signaling about the provided provisioning profile service. This, again, is a feature rendering the provisioning of a large number of devices, e.g. M2M devices, less complicated and highly cost-efficient.

In some embodiments, the signaling informing about an initial provisioning service for devices $3_1, \ldots, 3_N$ is a first message comprising one or both of: an address of an embedded Universal Integrated Circuit Card, eUICC, initial provisioning service and a reference to an eUICC initial provisioning service on the provisioning node 4.

The first message may be seen as an advertisement message sent from the provisioning node 4 for advertising its provisioning service. The reference to an eUICC initial provisioning service may, for instance, be a Uniform Resource Locator (URL) or a Uniform Resource Identifier (URI).

In various embodiments, the obtaining 14 the provisioning profile for the device $3_1, \ldots, 3_N$ comprises:
- creating a second provisioning profile request based on the identifier of the device $3_1, \ldots, 3_N$,
- sending the second provisioning profile request to the subscription manager 2, and
- receiving the provisioning profile for the device $3_1, \ldots, 3_N$.

In various embodiments, the obtaining 14 the provisioning profile for the device $3_1, \ldots, 3_N$ comprises matching the identifier of the device $3_1, \ldots, 3_N$ to a provisioning profile and retrieving the provisioning profile from a data storage 5.

From the above two exemplary embodiments, it is clear that there are different ways for the provisioning node 4 to obtain the requested provisioning profile, and the specific implementation of the method 10 can be made to suit the particular circumstances and prerequisites at hand. When using a data storage 5, the provisioning node 4 should have access to it. The data storage 5 may be an integrated part of the provisioning node 4 or it may be standalone entity from which the provisioning node 4 can retrieve the desired provisioning profile.

In various embodiments, the authenticating 13 the device $3_1, \ldots, 3_N$ comprises a mutual trust authentication mechanism.

The mutual trust authentication may, for instance, be based on certificate verification by a trusted certificate authority 6, wherein the device $3_1, \ldots, 3_N$ and the provisioning node 4 have a respective certificate signed by the certificate authority 6. Another example on a mutual trust authentication mechanism that may be used, is a digest authentication mechanism comprising use of a respective certificate of the device $3_1, \ldots, 3_N$ and the provisioning node 4 for establishing trust them between. Theses mechanisms have different advantages. For instance, the first mechanism is highly secure, but requires the device $3_1, \ldots, 3_N$ to have a certificate stored thereon. The second mechanism is less secure, but has the advantage of not requiring the device $3_1, \ldots, 3_N$ to have a stored certificate, which may be costly.

Figure 4:
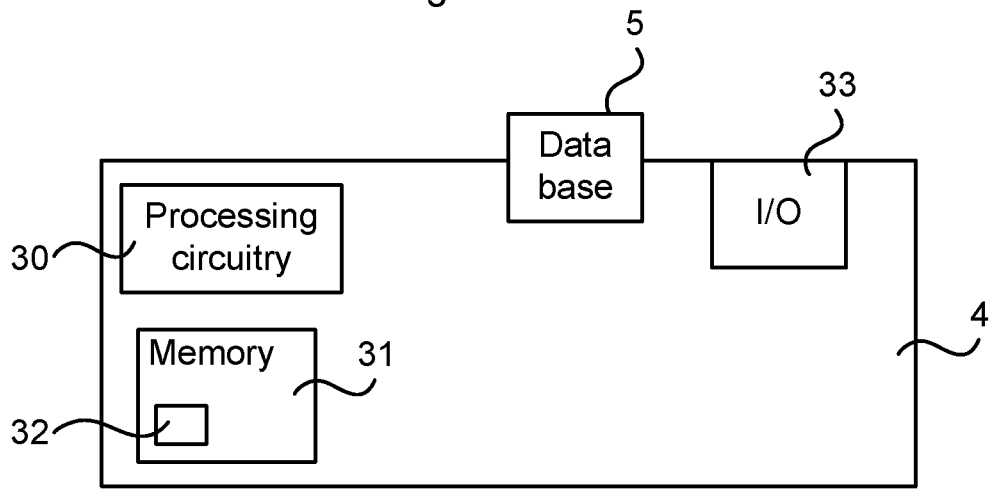
FIG. 4 illustrates schematically a node and means for implementing embodiments of the method in accordance with the present teachings.

FIG. 4 illustrates schematically a node and means for implementing embodiments of the method in accordance with the present teachings. The node 4 comprises processing circuitry 30, which may be any combination of one or more of a suitable central processing unit (CPU), multiprocessor, microcontroller, digital signal processor (DSP), etc., capable of executing software instructions stored in a computer program product 31, e.g. in the form of a storage medium 31. The processing circuitry 30 may further be provided as at least one application specific integrated circuit (ASIC), or field programmable gate array (FPGA).

The processing circuitry 30 is configured to cause the node 4 to perform a set of operations, or steps, e.g. as described in relation to FIGS. 2, 3. For example, the storage medium 31 may store the set of operations, and the processing circuitry 30 may be configured to retrieve the set of operations from the storage medium 31 to cause the node 4 to perform the set of operations. The set of operations may be provided as a set of executable instructions. The processing circuitry 30 is thereby arranged to execute methods as disclosed herein.

The storage medium 31 may also comprise persistent storage, which, for example, can be any single one or combination of magnetic memory, optical memory, solid state memory or even remotely mounted memory.

The provisioning node 4 may also comprise an input/output device 33 for communicating with other entities and devices. The input/output device 33 may be an interface and may, for instance, comprise a protocol stack, for communication with other devices (e.g. the nodes of the system 1) or entities. The input/output device 33 may be used for receiving data input, e.g. provisioning profile requests from devices $3_1, \ldots, 3_N$, and for outputting data, e.g. sending bootstrapping related data (e.g. provisioning profiles) when a device $3_1, \ldots, 3_N$ is to be bootstrapped. The input/output device 33 may comprise receiving circuitry and transmitting circuitry. The provisioning node 4 may also comprise an antenna device and transmission/reception circuitry for wireless communication with the devices $3_1, \ldots, 3_N$.

As noted earlier, the provisioning node 4 may comprise or otherwise have access to a database 5. The database 5 may, for instance, comprise lists of devices $3_1, \ldots, 3_N$ being eligible for being provided with a provisioning profile, or data enabling the provisioning node 4 to match a device identifier to a provisioning profile.

A provisioning node 4 is provided for automatic bootstrapping of a device $3_1, \ldots, 3_N$. The provisioning node 4 is connected to a subscription manager 2. The provisioning node 4 is configured to:
- receive a provisioning profile request from the device $3_1, \ldots, 3_N$, the provisioning profile request comprising an identifier of the device $3_1, \ldots, 3_N$,
- authenticate the device $3_1, \ldots, 3_N$,
- obtain, based on the identifier of the device $3_1, \ldots, 3_N$, a provisioning profile for the device $3_1, \ldots, 3_N$, and
- send the provisioning profile to the device $(3_1, \ldots, 3_N)$.

The provisioning node 4 may be configured to perform the above steps, and implement any of the described embodiments of the method, e.g. by comprising one or more processors 30 and memory 31, the memory 31 containing instructions executable by the processor 30, whereby the provisioning node 4 is operative to perform the steps.

In an embodiment thus, a provisioning node 4 for automatic bootstrapping of a device is provided. The provisioning node 4 comprises one or more processors 30 and memory 31, the memory 31 containing instructions executable by the processor 30, whereby the provisioning node is operative to: receive a provisioning profile request from the device, the provisioning profile request comprising an identifier of the device, authenticate the device, obtain, based on the identifier of the device, a provisioning profile for the device, and send the provisioning profile to the device.

In an embodiment, the provisioning node 4 is configured to, before the receiving the provisioning profile request, transmit signaling informing about an initial provisioning service for devices $3_1, \ldots, 3_N$.

In some embodiments, the signaling informing about an initial provisioning service for devices $3_1, \ldots, 3_N$ is a first message comprising one or both of: an address of an embedded Universal Integrated Circuit Card, eUICC, initial provisioning service and a reference to an eUICC initial provisioning service on the provisioning node 4.

In some embodiments, the provisioning node 4 is configured to obtain the provisioning profile for the device $3_1, \ldots, 3_N$ by:

creating a second provisioning profile request based on the identifier of the device $3_1, \ldots, 3_N$, sending the second provisioning profile request to the subscription manager 2, and receiving the provisioning profile for the device $3_1, \ldots, 3_N$.

In some embodiments, the provisioning node 4 is configured to obtain the provisioning profile for the device by matching the identifier of the device $3_1, \ldots, 3_N$ to a provisioning profile and retrieving the provisioning profile from a data storage 5.

In some embodiments, the provisioning node 4 is configured to the authenticate the device $3_1, \ldots, 3_N$ by a mutual trust authentication mechanism.

Figure 5:
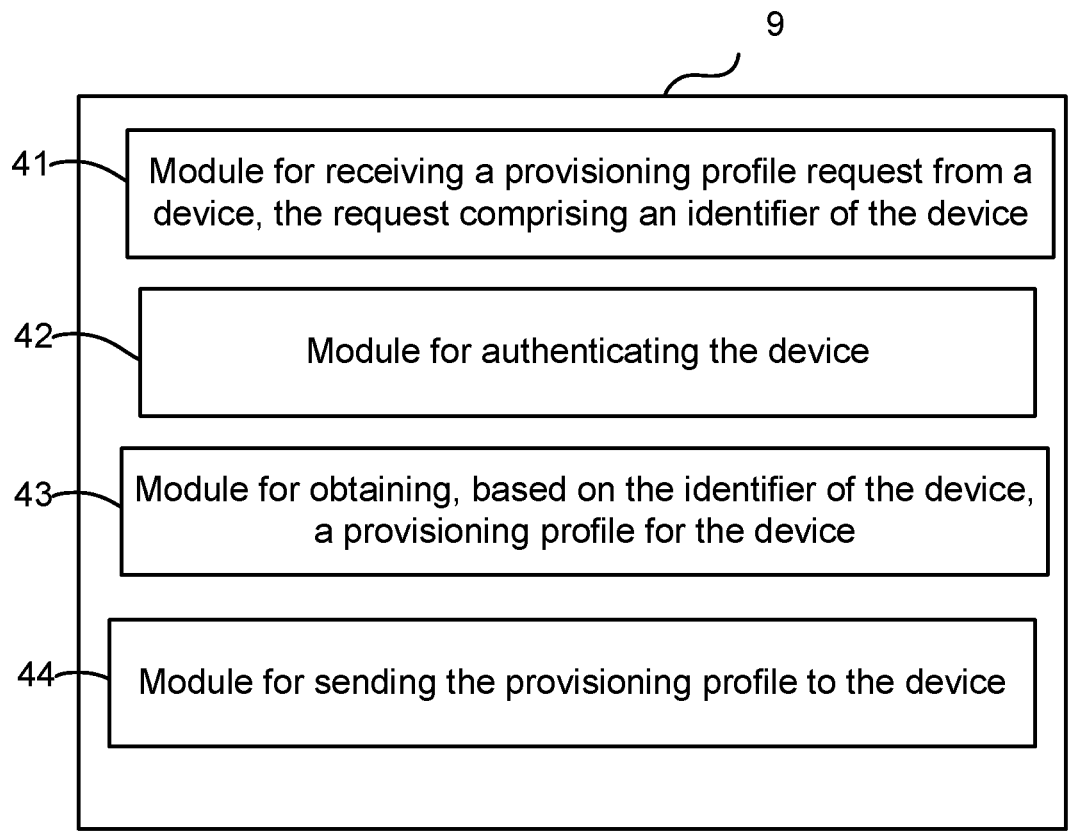
FIG. 5 illustrates a node comprising function modules/software modules for implementing embodiments of the present teachings.

FIG. 5 illustrates a node comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

A provisioning node 4 for automatic bootstrapping of a device is provided. The provisioning node comprises a first module 41 for receiving a provisioning profile request from a device, the request comprising an identifier of the device. Such first module 41 may, for instance, comprise receiving circuitry or an input device.

The provisioning node comprises a second module 42 for authenticating the device. Such second module 42 may, for instance, comprise processing circuitry adapted to perform steps of a mutual authentication process. The second module 42 may, for instance, take as a first input a certificate from the device.

The provisioning node comprises a third module 43 for obtaining, based on the identifier of the device, a provisioning profile for the device. The third module 43 may, for instance, comprise processing circuitry adapted to obtain the provisioning profile. The third module 43 may, for instance, be adapted to obtain the identifier of the device and adapted to obtain (e.g. from a database) a provisioning profile linked to this identifier.

The provisioning node comprises a fourth module 44 for sending the provisioning profile to the device. Such fourth module 44 may, for instance, comprise transmitting circuitry or an output device.

The provisioning node 4 may also comprise one or more modules for being capable of receiving and processing a combination of input, e.g. inputs such as provisioning requests and data from a database.

It is noted that one or more of the modules 41, 42, 43, 44 may be replaced by units.

Figure 6:
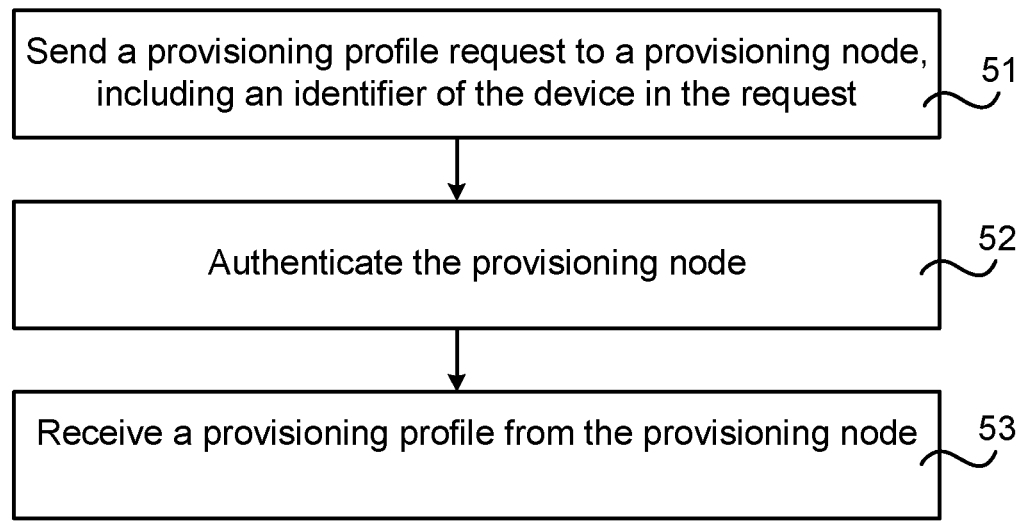
FIG. 6 illustrates a flow chart over steps of an embodiment of a method in a device in accordance with the present teachings.

FIG. 6 illustrates a flow chart over steps of an embodiment of a method in a device in accordance with the present teachings. The method 50 for bootstrapping may be performed by a device $3_1, \ldots, 3_N$ comprising communication means for communicating wirelessly with a provisioning node. The method 50 comprises:

sending 52 a provisioning profile request to a provisioning node 4, including in the provisioning profile request an identifier of the device $3_1, \ldots, 3_N$, authenticating 53 the provisioning node 4, and receiving 54, from the provisioning node 4, a provisioning profile.

A device $3_1, \ldots, 3_N$ implementing the method 50 can easily obtain a provisioning profile. The manufacturer of the device does not need to provide it with a provisioning profile beforehand, reducing costs thereof.

In an embodiment, the method 50, comprises, before sending 52 the provisioning profile request, receiving 51 a first message from the provisioning node 4, the first message comprising information enabling the sending 52 of the provisioning profile request.

The first message may be seen as an advertisement message sent by a provisioning node 4 for informing about its provisioning service.

In a variation of the above embodiment, the first message comprises one or both of: an address of an embedded Universal Integrated Circuit Card, eUICC, initial provisioning service and a reference to an eUICC initial provisioning service on the provisioning node 4.

The first message (an advertisement message) may thus be an "eUIIC initial provisioning service" message, sent by the provisioning node 4, and may, for instance, comprise the address of the provisioning node 4, whereby the device is able to send its provisioning profile request. The first message may also comprise a Uniform Resource Locator (URL) or a Uniform Resource Identifier (URI) of the eUICC initial provisioning service on the provisioning node 4.

In various embodiments, the method 50 comprises broadcasting, before the sending 52 the provisioning profile request, a second message and receiving in response a message comprising an address of the provisioning node 4.

The second message may be seen as a discovery message, which is a message trying to discover a provisioning service, in particular a "eUIIC initial provisioning service". The second message may, for instance, comprise the address of the provisioning node 4, whereby the device is able to send its provisioning profile request. The discovery message may also comprise a Uniform Resource Locator (URL) or a Uniform Resource Identifier (URI) of the eUICC initial provisioning service on the provisioning node 4.

In various embodiments, the authenticating 13 the provisioning node 4 comprises one of:

a mutual trust authentication mechanism based on certificate verification by a trusted certificate authority 6, wherein the device $3_1, \ldots, 3_N$ and the provisioning node 4 have a respective certificate signed by the certificate authority 6, and a digest authentication mechanism comprising use of a respective certificate of the device $3_1, \ldots, 3_N$ and the provisioning node 4 for establishing trust them between.

It is noted that the authentication implemented may be selected among any known mutual authentication method.

In various embodiments, the method 50 comprises using the received provisioning profile for obtaining access to a wireless network.

Figure 7:
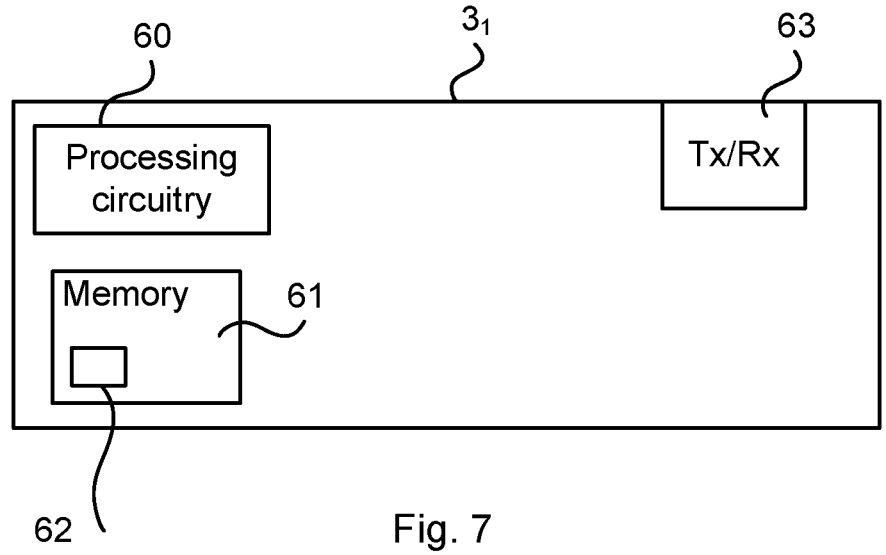
FIG. 7 illustrates schematically a device and means for implementing embodiments of the method in accordance with the present teachings.

FIG. 7 illustrates schematically a device and means for implementing embodiments of the method in accordance with the present teachings. The device $3_1, \ldots, 3_N$ comprises processing circuitry 60, which may be any combination of one or more of a suitable central processing unit (CPU), multiprocessor, microcontroller, digital signal processor (DSP), etc., capable of executing software instructions stored in a computer program product 61, e.g. in the form of a storage medium 61. The processing circuitry 60 may further be provided as at least one application specific integrated circuit (ASIC), or field programmable gate array (FPGA).

The processing circuitry 60 is configured to cause the device $3_1, \ldots, 3_N$ to perform a set of operations, or steps, e.g. as described in relation to FIGS. 2, 6. For example, the storage medium 61 may store the set of operations, and the processing circuitry 60 may be configured to retrieve the set of operations from the storage medium 361 to cause the device $3_1, \ldots, 3_N$ to perform the set of operations. The set of operations may be provided as a set of executable instructions. The processing circuitry 60 is thereby arranged to execute methods as disclosed herein.

The storage medium 6 may also comprise persistent storage, which, for example, can be any single one or combination of magnetic memory, optical memory, solid state memory or even remotely mounted memory.

The device $3_1, \ldots, 3_N$ may also comprise an input/output device 63 for communicating with other entities and devices. The input/output device 63 may, for instance, comprise a protocol stack, for communication with the gateway node 4 of the system 1. The input/output device 63 may be used for receiving data input and for outputting data, e.g. receiving/sending bootstrapping related data when the device $3_1, \ldots, 3_N$ is to be bootstrapped. The input/output device 63 may comprise receiving circuitry and transmitting circuitry. The device $3_1, \ldots, 3_N$ may also comprise an antenna device for wireless communication with the gateway node 4.

A device $3_1, \ldots, 3_N$ for bootstrapping performed is provided. The device $3_1, \ldots, 3_N$ is configured to:
send a provisioning profile request to a provisioning node 4, including in the provisioning profile request an identifier of the device $3_1, \ldots, 3_N$,
authenticate 53 the provisioning node 4, and
receive 54, from the provisioning node 4, a provisioning profile.

The device $3_1, \ldots, 3_N$ may be configured to perform the above steps, and implement any of the described embodiments of the method, e.g. by comprising one or more processors 60 and memory 61, the memory 61 containing instructions executable by the processor 60, whereby the device $3_1, \ldots, 3_N$ is operative to perform the steps.

In an embodiment thus, a device $3_1, \ldots, 3_N$ for bootstrapping is provided. The device $3_1, \ldots, 3_N$ comprises one or more processors 60 and memory 61, the memory 61 containing instructions executable by the processor 60, whereby the device is operative to: send a provisioning profile request to a provisioning node, including in the provisioning profile request an identifier of the device, authenticate the provisioning node, and receive, from the provisioning node 4, a provisioning profile.

In an embodiment, the device $3_1, \ldots, 3_N$ is configured to, before sending the provisioning profile request, receive a first message from the provisioning node 4, the first message comprising information enabling the sending of the provisioning profile request.

The first message may be seen as an advertisement message sent by a provisioning node 4 offering its provisioning service.

In various embodiments, the first message comprises one or both of: an address of an embedded Universal Integrated Circuit Card, eUICC, initial provisioning service and a reference to an eUICC initial provisioning service on the provisioning node 4.

In various embodiments, the device $3_1, \ldots, 3_N$ is configured to broadcast, before sending the provisioning profile request, a second message and receiving in response a message comprising an address of the provisioning node 4.

In various embodiments, the device $3_1, \ldots, 3_N$ is configured to authenticate the provisioning node 4 by one of:
a mutual trust authentication mechanism based on certificate verification by a trusted certificate authority 6, wherein the device $3_1, \ldots, 3_N$ and the provisioning node 4 have a respective certificate signed by the certificate authority 6, and
a digest authentication mechanism comprising use of a respective certificate of the device $3_1, \ldots, 3_N$ and the provisioning node 4 for establishing trust them between.

In various embodiments, the device $3_1, \ldots, 3_N$ is configured to use the received provisioning profile for obtaining access to a wireless network.

Figure 8:
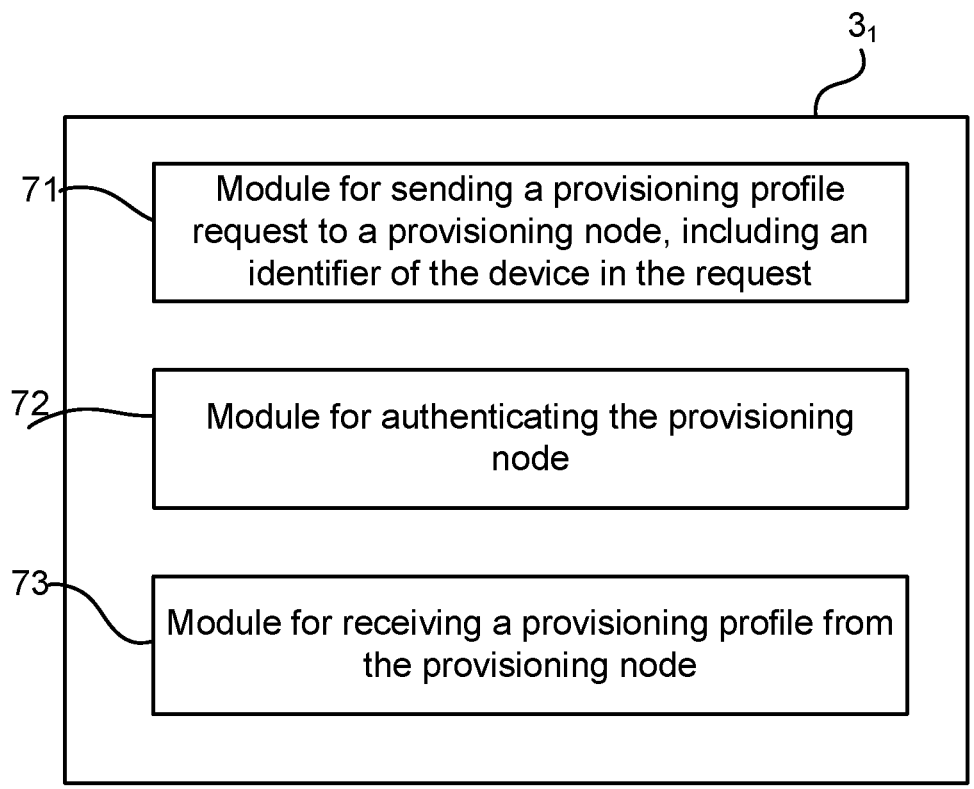
FIG. 8 illustrates a device comprising function modules/software modules for implementing embodiments of the present teachings.

FIG. 8 illustrates a device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

A device $3_1$ for bootstrapping is provided. The device comprises a first module 71 for sending a provisioning profile request to a provisioning node, including an identifier of the device in the request. The first module 71 may, for instance, comprise transmitting circuitry or an output device.

The device comprises a second module 72 for authenticating the provisioning node. Such second module 72 may, for instance, comprise processing circuitry adapted to perform steps of a mutual authentication process. The second module 72 may, for instance, take as a first input a certificate from the provisioning node.

The device comprises a third module 73 for receiving a provisioning profile from the provisioning node. The third module 73 may, for instance, comprise receiving circuitry or an input device.

The device $3_1$ may also comprise one or more modules for being capable of receiving and processing a combination of input, e.g. the device $3_1$ may comprise modules for processing a received authentication message and an internal certificate.

It is noted that one or more of the modules 71, 72, 73 may be replaced by units.

The present disclosure has mainly been described herein with reference to a few embodiments. However, as is appreciated by a person skilled in the art, other embodiments than the particular ones disclosed herein are equally possible within the scope of the present disclosure, as defined by the appended patent claims.

The invention claimed is:

1. A method of operating a provisioning node connected to a subscription manager for automatic bootstrapping of a device, the method comprising:
receiving a provisioning profile request from the device, the provisioning profile request comprising an identifier of the device;

authenticating the device;
obtaining a provisioning profile for the device using the identifier of the device; and
transmitting the provisioning profile to the device,
wherein obtaining the provisioning profile for the device comprises matching the identifier of the device to a provisioning profile and retrieving the provisioning profile from a data storage.

2. The method of claim 1, further comprising:
transmitting, before the receiving the provisioning profile request, a message including information regarding an initial provisioning service for devices.

3. The method of claim 2, wherein the information comprises at least one of an address of an embedded Universal Integrated Circuit Card, eUICC, initial provisioning service and a reference to an eUICC initial provisioning service on the provisioning node.

4. The method of claim 1, wherein obtaining the provisioning profile for the device further comprises:
creating a second provisioning profile request based on the identifier of the device,
transmitting the second provisioning profile request to the subscription manager, and receiving the provisioning profile for the device.

5. The method of claim 1, wherein authenticating the device comprises authenticating the device using a mutual trust authentication mechanism.

6. A method of operating a device for bootstrapping, the method comprising:
broadcasting a first message;
responsive to broadcasting the first message, receiving a second message comprising an address of a provisioning node;
responsive to receiving the second message, transmitting a provisioning profile request to the provisioning node, the provisioning profile request comprising an identifier of the device;
authenticating the provisioning node; and
receiving, from the provisioning node, a provisioning profile.

7. The method of claim 6, further comprising:
receiving, before transmitting the provisioning profile request, a third message from the provisioning node, the third message comprising information enabling the provisioning profile request to be transmitted.

8. The method of claim 7, wherein the third message comprises at least one of an address of an embedded Universal Integrated Circuit Card, eUICC, initial provisioning service and a reference to an eUICC initial provisioning service on the provisioning node.

9. The method of claim 6, wherein authenticating-the provisioning node comprises:
authenticating the provisioning node using a mutual trust authentication mechanism based on certificate verification by a trusted certificate authority, wherein the device and the provisioning node have a respective certificate signed by the certificate authority, or
authenticating the provisioning node using a digest authentication mechanism comprising use of a respective certificate of the device and the provisioning node for establishing trust them between.

10. The method of claim 6, further comprising:
using the received provisioning profile for obtaining access to a wireless network.

11. A provisioning node for automatic bootstrapping of a device, the provisioning node comprising:

a processor; and
memory coupled to the processor, the memory having instructions stored therein that are executable by the processor to cause the provisioning node to perform operations, the operations comprising:
receiving a provisioning profile request from the device, the provisioning profile request comprising an identifier of the device;
authenticating the device;
obtaining a provisioning profile for the device using the identifier of the device; and
transmitting the provisioning profile to the device,
wherein obtaining the provisioning profile for the device comprises:
creating a second provisioning profile request based on the identifier of the device,
transmitting the second provisioning profile request to the subscription manager, and
receiving the provisioning profile for the device.

12. The provisioning node of claim 11, wherein the operations further comprise:
transmitting, before receiving the provisioning profile request, a message including information regarding an initial provisioning service for devices.

13. The provisioning node of claim 12, wherein the information comprises at least one of an address of an embedded Universal Integrated Circuit Card, eUICC, initial provisioning service, and a reference to an eUICC initial provisioning service on the provisioning node.

14. The provisioning node of claim 11, wherein the provisioning node is a provisioning gateway.

15. A device for bootstrapping, the device comprising:
a processor; and
memory coupled to the processor, the memory having instructions stored therein that are executable by the processor to cause the device to perform operations, the operations comprising:
broadcasting a first message;
responsive to broadcasting the first message, receiving a second message comprising an address of a provisioning node;
responsive to receiving the second message, transmitting a provisioning profile request to a provisioning node, the provisioning profile request including an identifier of the device;
authenticating the provisioning node; and
receiving, from the provisioning node, a provisioning profile.

16. The device of claim 15, wherein the operations further comprise:
receiving, before transmitting the provisioning profile request, third message from the provisioning node, the third message comprising information enabling the provisioning profile request to be transmitted.

17. The device of claim 15, wherein the device is an Embedded Universal Integrated Circuit Card, eUICC, device or an Integrated Universal Integrated Circuit Card, iUICC.

18. The device of claim 15, wherein authenticating-the provisioning node comprises:
authenticating the provisioning node using a mutual trust authentication mechanism based on certificate verification by a trusted certificate authority, wherein the device and the provisioning node have a respective certificate signed by the certificate authority, or
authenticating the provisioning node using a digest authentication mechanism comprising use of a respective certificate of the device and the provisioning node for establishing trust them between.

19. The provisioning node of claim 11, wherein obtaining the provisioning profile for the device further comprises matching the identifier of the device to a provisioning profile and retrieving the provisioning profile from a data storage.

* * * * *